(12) United States Patent
Gretz

(10) Patent No.: US 7,087,837 B1
(45) Date of Patent: Aug. 8, 2006

(54) ADJUSTABLE ELECTRICAL BOX ASSEMBLY

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 0 days.

(21) Appl. No.: 11/136,852

(22) Filed: May 25, 2005

Related U.S. Application Data

(63) Continuation-in-part of application No. 11/120,707, filed on May 3, 2005.

(51) Int. Cl.
*H01H 9/02* (2006.01)

(52) U.S. Cl. .............................. 174/58; 174/53; 174/57; 220/3.2; 220/3.3; 248/906

(58) Field of Classification Search .................. 174/48, 174/49, 50, 53, 57, 58; 220/3.2, 3.3, 3.4, 220/3.5, 3.6, 3.7, 3.8, 3.9, 4.02; 248/906, 248/343; D13/152; 439/535, 536, 537, 439/538, 539, 925
See application file for complete search history.

(56) References Cited

U.S. PATENT DOCUMENTS

| | | | |
|---|---|---|---|
| 3,620,404 A * | 11/1971 | Grasso | ........................ 174/48 |
| 4,645,089 A | 2/1987 | Horsley | |
| 4,747,506 A | 5/1988 | Stuchlik, III | |
| 4,842,155 A * | 6/1989 | Begin, Jr. | ..................... 220/3.6 |
| 4,918,259 A * | 4/1990 | Hanson | ........................ 174/66 |
| 5,042,673 A * | 8/1991 | McShane | ..................... 220/3.7 |
| 5,253,831 A | 10/1993 | Theodorides | |
| 6,596,938 B1 * | 7/2003 | Gilleran | ........................ 174/58 |
| 6,765,146 B1 * | 7/2004 | Gerardo | ........................ 174/58 |
| 6,875,922 B1 | 4/2005 | Petak et al. | |
| 6,878,877 B1 | 4/2005 | Cozzi et al. | |
| 6,956,172 B1 * | 10/2005 | Dinh | ........................... 174/58 |

* cited by examiner

*Primary Examiner*—Angel R. Estrada

(57) ABSTRACT

An assembly that enables easy mounting of an electrical box on an unfinished wall at a desired offset from the wall's eventual surface. The assembly includes an electrical box and a slide member. The slide member includes a flange having a rear surface, an opening therein, and arms extending rearwardly from the rear surface. The electrical box includes sidewalls having apertures therein, a front opening, a front edge, and a cavity for receiving an electrical device. The slide member is slideable with respect to the electrical box. A mounting arrangement is included on the flange for securing the slide member to the wall. A fastening and adjustment arrangement on the arms enables the box to be secured to the slide member and also enables easy adjusting of the offset of the front edge of the box from the wall surface.

10 Claims, 9 Drawing Sheets

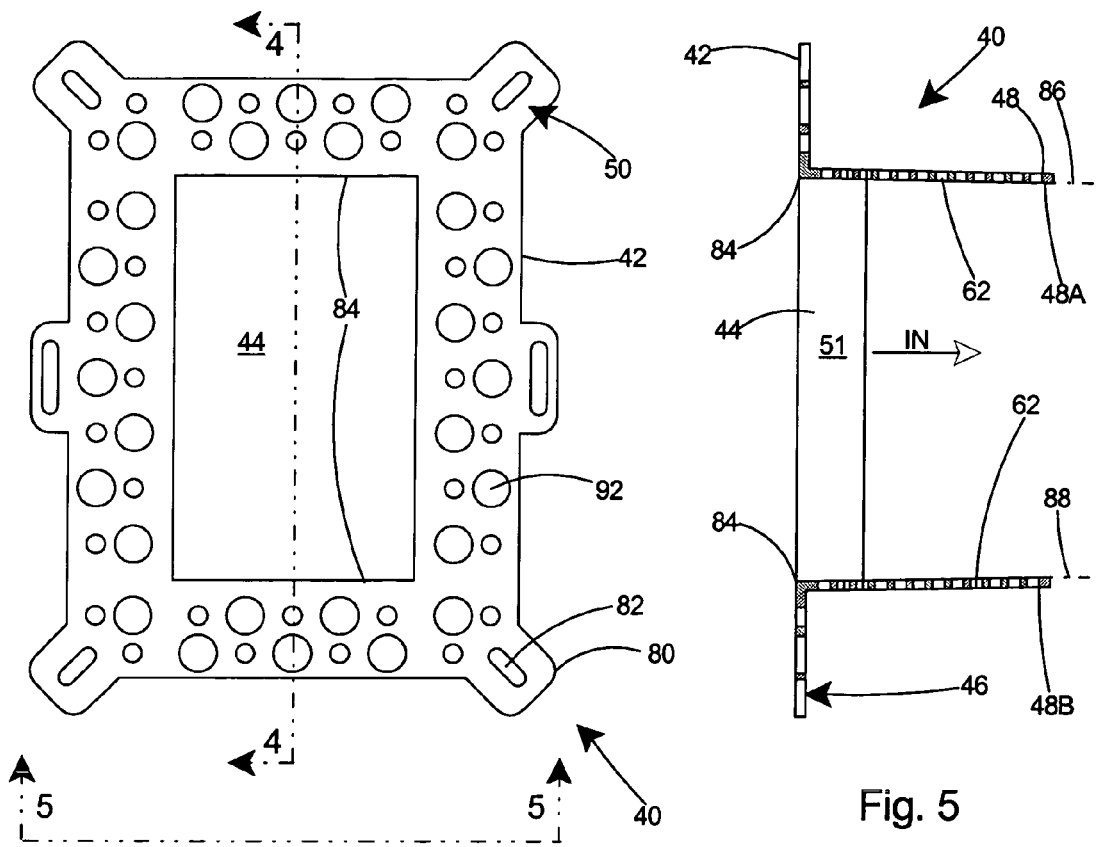
Fig. 4
Fig. 5
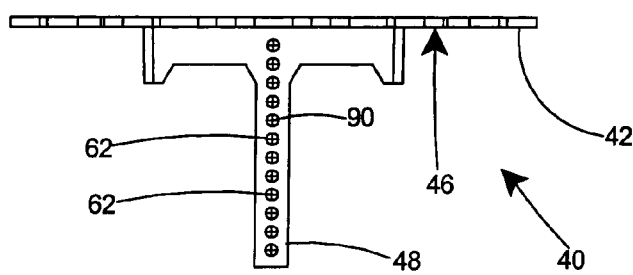
Fig. 6

ADJUSTABLE ELECTRICAL BOX ASSEMBLY

This application is a continuation-in-part of U.S. patent application Ser. No. 11/120,707 filed May 3, 2005 and still pending.

FIELD OF THE INVENTION

This invention relates to electrical junction boxes and specifically to an electrical box assembly that enables an installer to secure an electrical box to a block wall at a desired offset from the wall.

BACKGROUND OF THE INVENTION

In building construction, electrical boxes for wall-mounted devices, such as duplex receptacles or switches, are usually installed by the electrical contractor prior to the finishing of the walls. Since the wall finishing has not yet been installed at the time of the electrical work, the electrical contractor must anticipate the level of the finished wall and install the electrical boxes such that the front edge is at the desired offset from the finished wall. With the current state of the art, the electrical contractor must therefore measure during the installation of each separate electrical box to insure that the box is positioned at the correct offset with respect to the wall.

In construction of stucco walls, the wall studs are typically covered with plywood and then with foam. The foam thickness can be ½, ¾, 1", etc., depending on the weather in the area it's being installed in and depending on the local requirements. For example, for installation of a covered electrical box for a duplex outlet, if the local code calls for 1" of foam and ¼" of stucco, then the contractor must typically allow 1¼" for the thickness of foam and stucco plus ½ for the front of the box to extend beyond the wall surface to allow the cover to open and close. This allows the electrical contractor to install the box on the unfinished wall and complete the electrical work ahead of the finishing contractor. With current state of the art electrical boxes for wall-mounted devices, the electrical contractor must measure the location of each electrical box with respect to the wall before securing the box in place.

A further problem with prior art electrical boxes arises from the fastening arrangement for securing to the wall. Prior art boxes typically have nails or screws set an angle to the front edge of the box and they typically tend to shift the box as the fasteners are hammered or screwed into the studs. Thus, even if the installer has measured for the correct offset from the wall, the fastening arrangement may shift the box away from the desired offset.

It should be apparent from the above discussion that installation of prior art electrical boxes is a time-consuming task that does not always result in an electrical box being positioned correctly with respect to the wall's surface. What is needed therefore is a device that reduces the time and effort involved in installing an electrical box at a desired offset from a wall's outer surface. The device must also include a fastening arrangement that does not cause shifting of the box as the box is secured to the framing members.

SUMMARY OF THE INVENTION

The invention is an assembly for mounting an electrical box on a wall such that the front edge of the box is at the desired offset from the wall's eventual surface. The assembly includes an electrical box and a slide member. The slide member includes a flange having a rear surface, an opening therein, and arms surrounding the opening and extending rearwardly from the rear surface. The electrical box includes sidewalls having apertures therein, a front opening, a front edge, and a cavity for receiving an electrical device. A mounting arrangement is included on the flange for securing the slide member to the wall. A fastening and adjustment arrangement is included on the arms for securing the box to the slide member and for adjusting the distance the front edge of the box is offset from the surface. The slide member is slideable with respect to the electrical box. A desired offset from the wall surface can be achieved by sliding the box within the slide member until the desired offset is achieved and then aligning guiding apertures in the slide member with receiving apertures in the box member and affixing a fastener therein to secure the box with respect to the slide member.

OBJECTS AND ADVANTAGES

The adjustable electrical box assembly of the present invention simplifies the process of mounting an electrical box with its front edge at a desired offset from a wall. Much less time and effort are required to install the electrical box of the current invention than is required with conventional methods.

Another advantage provided by the adjustable electrical box assembly of the present invention is the inclusion of a fastening arrangement that does not cause shifting of the front edge of the box with respect to the wall as the electrical box is secured thereto.

A further advantage of the adjustable electrical box assembly is that any electrical device secured therein is recessed well within the cavity, thereby protecting the electrical device therein from contact or breakage by accidental contact from lawn equipment or the like.

These and other objects and advantages of the present invention will be better understood by reading the following description along with reference to the drawings.

DESCRIPTION OF THE DRAWINGS

FIG. 4 is a front view of a slide member that forms a portion of an electrical box assembly according to the present invention.

FIG. 5 is a sectional view of the slide member taken along lines 5—5 of FIG. 7.

FIG. 6 is a side view of the slide member taken along lines 6—6 of FIG. 7.

TABLE OF NOMENCLATURE

Figure 1:
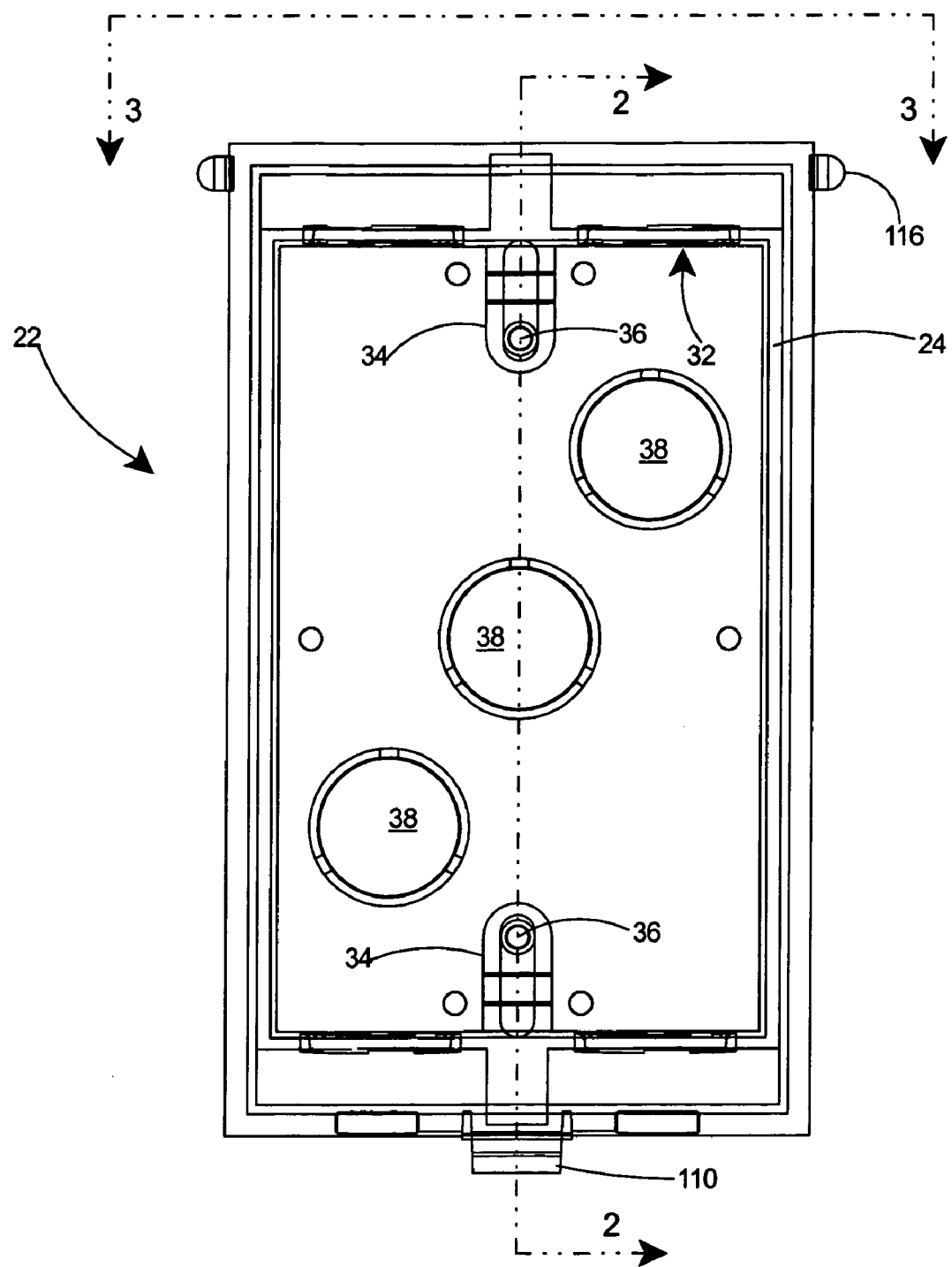
FIG. 1 is a front view of an electrical box that forms a portion of a vertical electrical box assembly according to the present invention.
Figure 2:
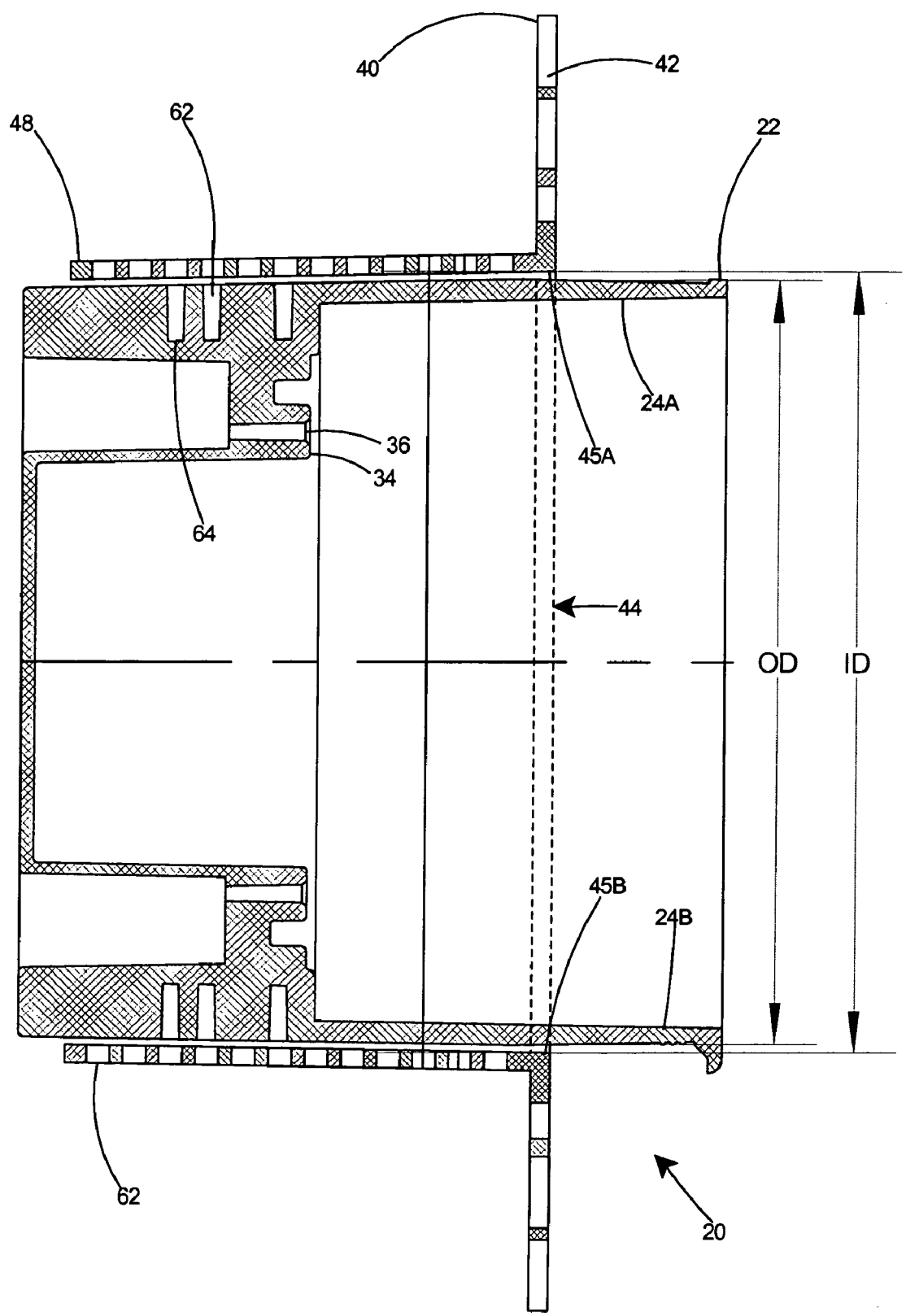
FIG. 2 is a sectional view of the vertical electrical box taken along lines 2—2 of FIG. 1.

The following is a listing of part numbers used in the drawings along with a brief description:

| Part Number | Description |
|---|---|
| 20 | vertical electrical box assembly |
| 22 | electrical box |
| 24 | sidewalls |
| 24A, 24B | opposing sidewalls |
| 24C | long sidewalls |
| 24D | short sidewalls |
| 26 | front opening |
| 28 | front edge |
| 30 | cavity |
| 31 | cover member |
| 32 | inner surface of box |
| 34 | boss |
| 35 | duplex outlet |
| 36 | bore |
| 37 | faceplate |
| 38 | removable wall portion |
| 39 | fastener |
| 40 | slide member |
| 42 | flange |
| 44 | opening in flange |
| 45A, 45B | opposing sides of opening |
| 46 | rear surface of flange |
| 48 | arm |
| 48A | first arm |
| 48B | second arm |
| 50 | mounting arrangement |
| 51 | brace |
| 52 | unfinished wall |
| 54 | mounting aperture |
| 56 | mounting fastener |
| 58 | surface of unfinished wall |
| 60 | fastening and adjustment arrangement |
| 62 | guiding aperture |
| 64 | receiving aperture |
| 66 | fastener |
| 68 | finished surface |
| 70 | finishing layer |
| 72 | stud |
| 74 | plywood |
| 76 | foam |
| 78 | stucco |
| 80 | ear |
| 82 | opening in ear |
| 84 | opposing sides of opening in flange |
| 86 | first plane |
| 88 | second plane |
| 90 | center of guiding aperture |
| 92 | apertures in flange |
| 94 | hole in wall |
| 102 | U-shaped slots in cover |
| 104 | latch member |
| 106 | opening in latch member |
| 108 | U-shaped slots in electrical box |
| 110 | tab |
| 112 | ears of cover member |
| 114 | apertures in cover |
| 116 | post |
| 120 | horizontal electrical box assembly |
| O1 | offset of front edge from wall's surface |
| O2 | offset of front edge from wall's surface |
| H | horizontal orientation |
| ID | inner dimension across opposing sides of opening |
| OD | outer dimension across opposing sides of opening |
| V | vertical orientation |

DETAILED DESCRIPTION OF THE INVENTION

The present invention comprises an electrical box assembly for mounting an electrical box for a wall-mounted device at a desired offset from the wall's surface.

Figure 7:
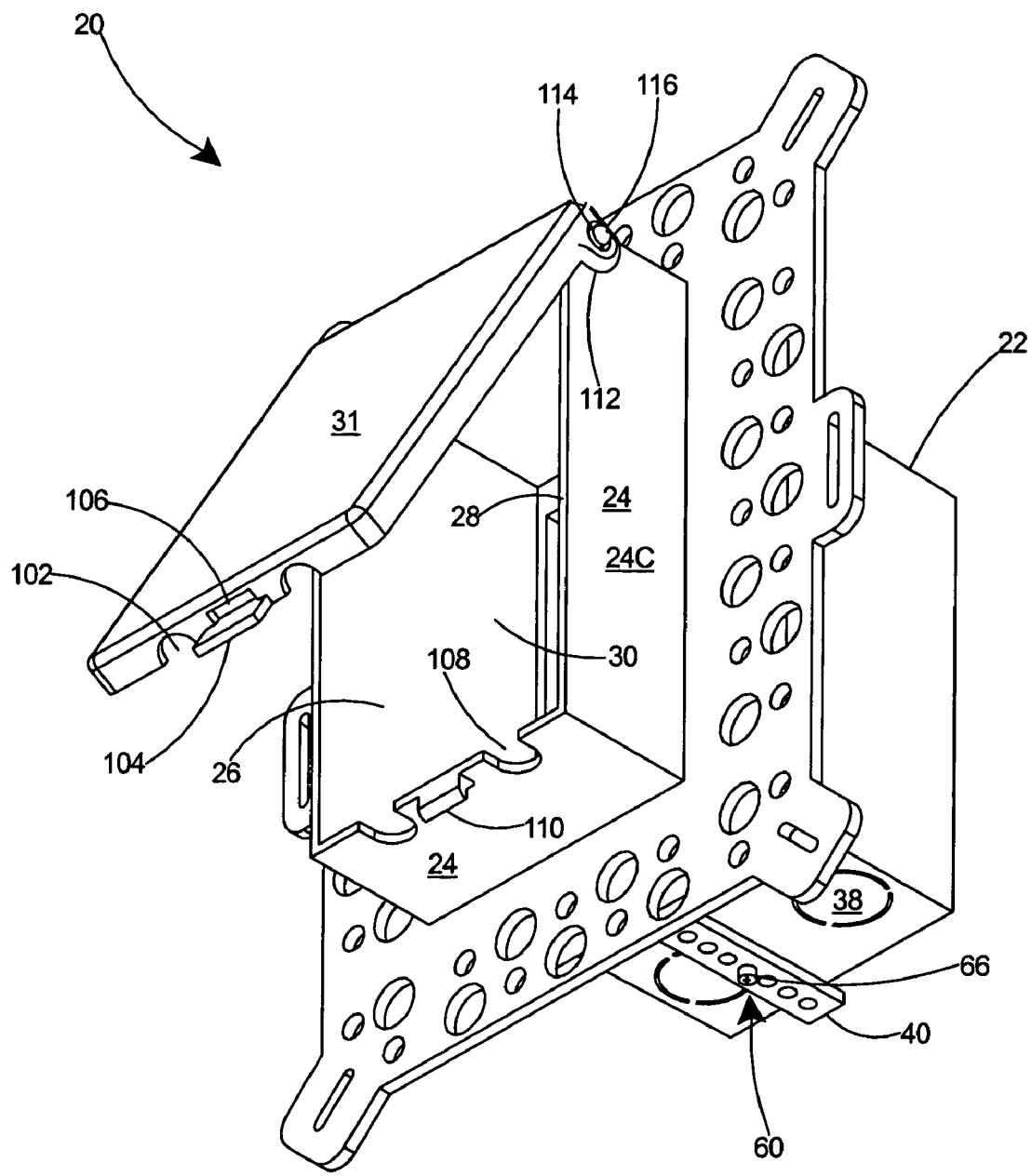
FIG. 7 is a perspective view of a vertical electrical box assembly according to the present invention.

With reference to FIG. 7, a first and preferred embodiment of an electrical box assembly 20 includes an electrical box 22 having sidewalls 24, a front opening 26, a front edge 28, and a cavity 30 for receiving an electrical device (not shown) therein. The electrical box assembly 20 may further include a cover member 31 for closing the cavity 30.

Referring to FIG. 1, the sidewalls 24 of the box 22 include an inner surface 32 and one or more bosses 34 integral with and extending from the inner surface 32 of the sidewalls 24 and having bores 36 therein. One or more removable wall portions 38 are provided in the sidewalls 24 of the electrical box 22.

Figure 9:
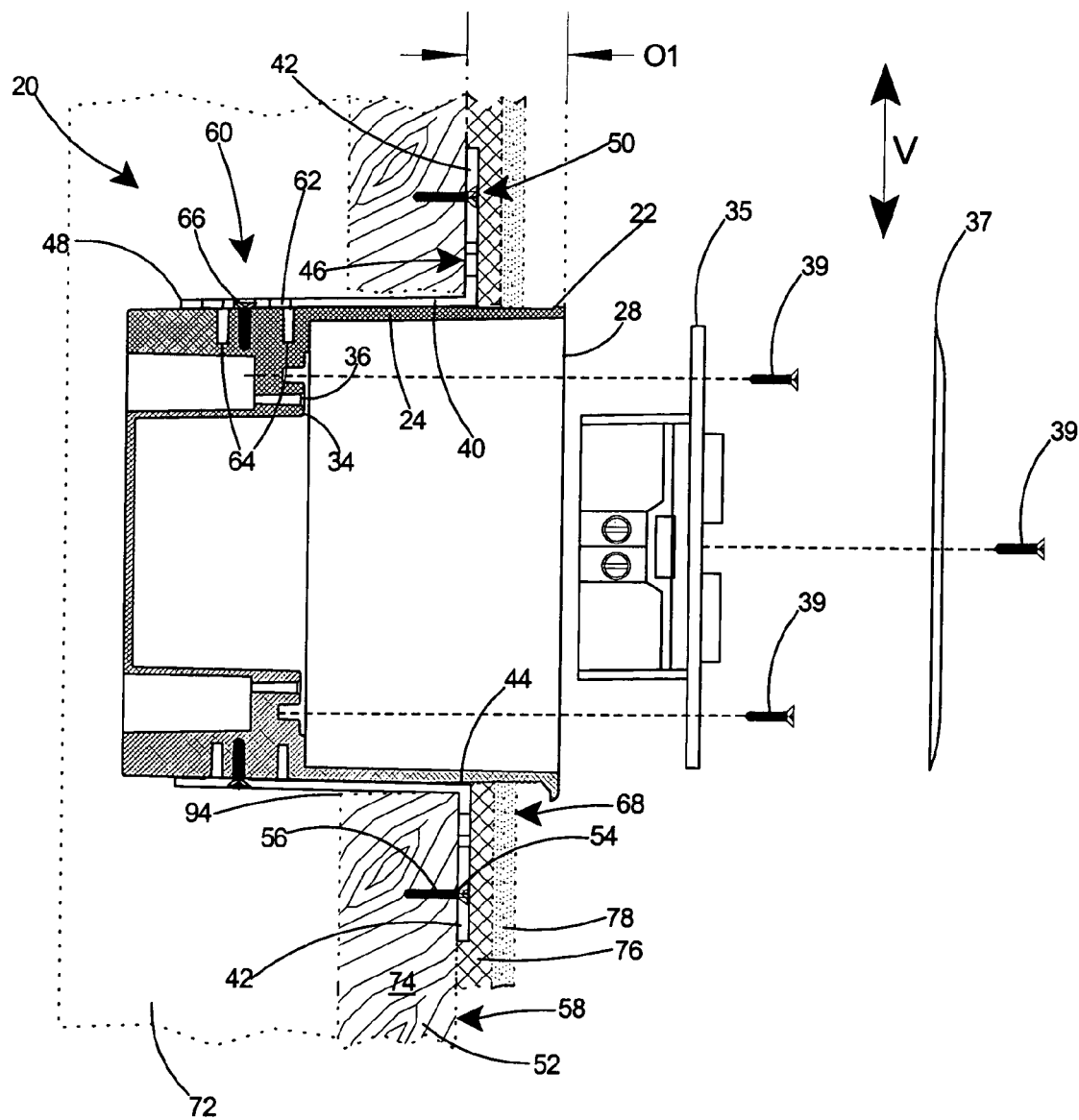
FIG. 9 is a sectional view of a vertical electrical box assembly secured to a wall.

With reference to the sectional view of FIG. 9, a duplex outlet 35 is shown in alignment with the bores 36 in the electrical box 22 and a faceplate 37 in alignment with the duplex outlet 35 to be secured thereto with fasteners 39. The electrical box assembly 20 further includes a slide member 40. The first embodiment of the electrical box assembly 20 described herein may be referred to as a vertical box assembly as it is used for securing a wall-mounted electrical device 35 to a wall in a vertical orientation (V arrow in FIG. 9).

Referring to FIGS. 4–6, the slide member 40 includes a flange 42 having an opening 44 therein. The flange 42 includes a rear surface 46 and arms 48 integral with the flange 42 and extending inwardly (see IN arrow on FIG. 5) from the rear surface 46, with inwardly referring to the direction with respect to the wall (not shown) that the slide member 40 will be fitted into. The arms 48 preferably extend perpendicularly from the flange. A mounting arrangement 50 is included on the flange 42 for securing the slide member to a wall surface (not shown). Brace members 51 extend horizontally from each side of the opening 44 in the flange 42 and extend vertically between the arms 48 thereby stiffening and adding support to the arms 48 and bracing them in their substantially parallel relationship to one another.

As shown in FIG. 9, which depicts the electrical box assembly 20 secured to an unfinished wall 52, the mounting arrangement 50 includes mounting apertures 54 in the flange 42 and mounting fasteners 56 for securing through the mounting apertures 54 in the flange 42 and into the surface 58 of the unfinished wall 52. A fastening and adjustment arrangement 60 is included on the arms 48 and on the electrical box 22 for securing the box 22 to the slide member 40 and for adjusting the distance the front edge of the box is offset from the surface. The fastening and adjustment arrangement 60 includes a plurality of guiding apertures 62 in the arms 48, a plurality of receiving apertures 64 in the sidewalls 24 of the electrical box 22, and at least one fastener 66 associated with each of the arms 48 for securing through the guiding apertures 62 in the arms 48 into the receiving apertures 64 in the sidewalls 24 of the electrical box 22. It is preferred that the arms have a thickness of at least 0.050 inch to be structurally sound enough to provide stiffness with respect to the slide member 40 and also so that the arms 48 can structurally hold a fastener and also be stiff enough to prevent movement of the box 22 once they are secured thereto.

Figure 3:
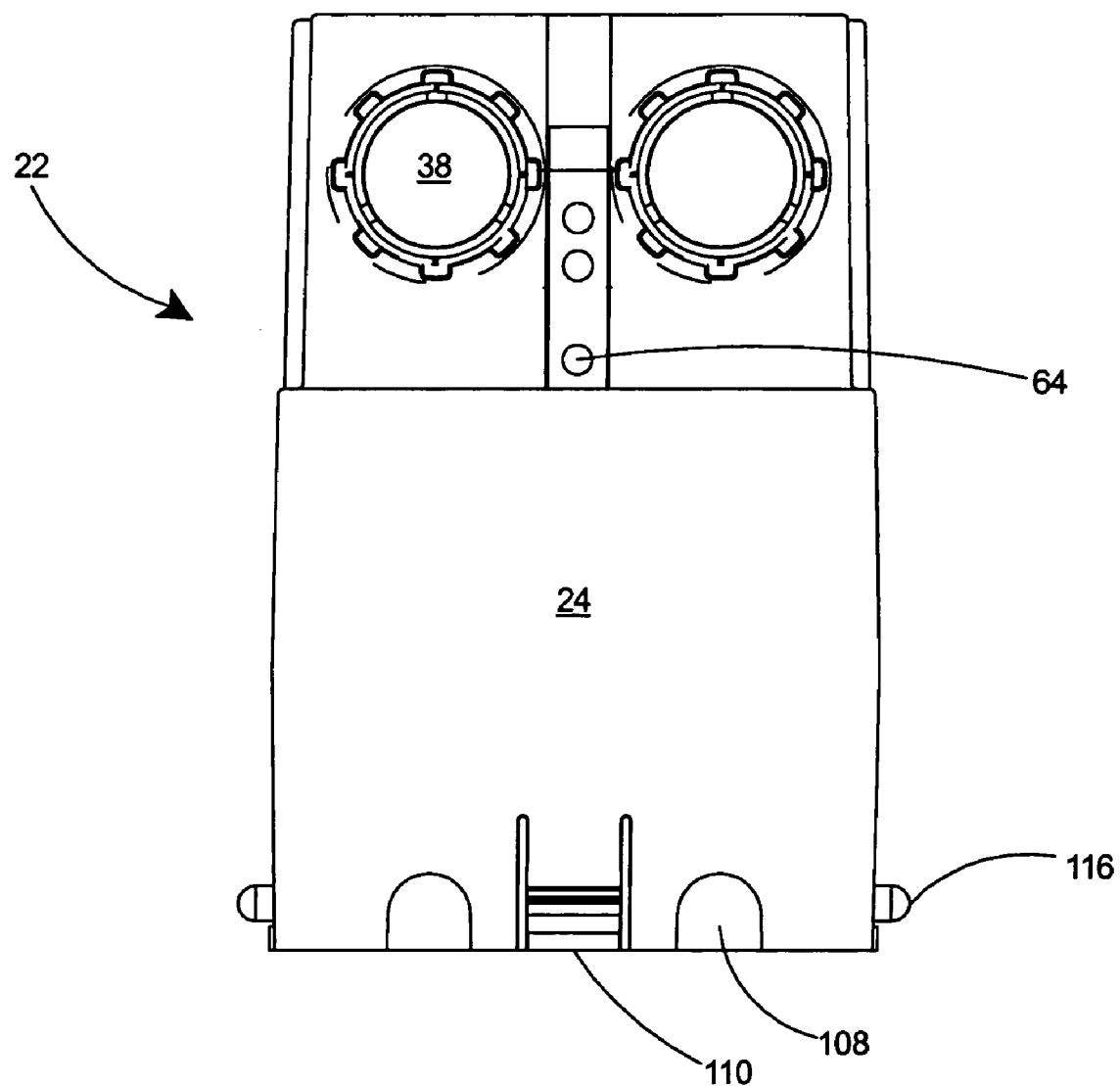
FIG. 3 is a top view of the vertical electrical box taken along lines 3—3 of FIG. 1.

Referring to FIG. 6, the guiding apertures 62 on the arms 48 are arranged longitudinally along the arms 48 in a linear alignment. As shown in FIG. 3, the receiving apertures 64 on the electrical box 22 are arranged longitudinally along the sidewall 24 of the box 22 in a linear alignment. When the electrical box 22 is inserted into the opening 44 in the flange portion 42 of the slide member 40, as shown in FIG. 9, the linearly aligned guiding apertures 62 in the arms 48 will be axially aligned with the receiving apertures 64 in the box 22. Only one fastener 66 is required per arm 48 to secure the electrical box 22 to the slide member 40. As the box 22 is slid with respect to the slide member 40, there will be numerous possible axial alignments between the guiding apertures 62 in the arms 48 and the receiving apertures 64 in the box 22. Therefore, the electrical box assembly 20 enables the setting of numerous offsets between the surface 58 of the unfinished wall 52 and the expected finished surface 68. The finishing layer 70 which will be installed on the wall dictates the expected finished surface 68. For stucco construction, the studs 72 are typically covered with a layer of plywood 74, a layer of foam 76, and a layer of stucco 78. The electrical box assembly 20 of the present invention therefore provides an easy and rapid method of securing an electrical box to an unfinished wall so as to achieve the exact desired offset from the finished wall.

After securing the slide member 40 to the electrical box 22 with the fastening and adjustment arrangement 60 as shown in FIG. 9, the electrical box assembly 20 consists of the slide member 40 and the electrical box 22 secured together as an integral unit as shown in FIG. 7.

With reference to FIG. 4, the flange 42 includes outward extending ears 80 having openings 82 therein. Preferably the flange 42 extends outward at least 0.5 inch from the opening. The preferred embodiment of the box 22 and slide member 40 of the present invention may be molded in one piece from plastic or may be formed from metal. In the preferred embodiment, the thickness of the flange 42 is preferably between 0.070 and 0.150 inch.

Referring to FIGS. 4 and 5, the opening 44 in the flange 42, although it is not limited to a single shape, in the embodiment shown herein the opening 44 has a rectangular shape and two sets of opposing sides 84. The arms 48 are two in number and are typically adjacent the opening 44 in the flange 42. The arms 48 extend from each side of one of the sets of opposing sides 84. The arms 48 therefore include a first arm 48A and a second arm 48B in substantially parallel planes 86 and 88 on opposing sides 84 of the opening 44 in the flange 42. Each guiding aperture 62 in the plurality of apertures in the first arm 48A is in axial alignment with a matching guiding aperture 62 in the plurality of apertures in the second arm 48B.

With reference to FIG. 5, the electrical box 22 typically includes opposing sidewalls 24A, 24B that have an outer dimension OD as measured across the opposing sidewalls 24A, 24B. The opening 44 in the flange 42 of the slide member 40 includes opposing sides 45A, 45B having an inner dimension ID as measured across the opposing sides 45A, 45B of the opening 44. The outer dimension OD across the opposing sidewalls 24A, 24B of the box is preferably between 0.001 and 0.090 inch smaller than the inner dimension ID across the opposing sides 45A, 45B of the opening 44 in the flange 42. This is a critical dimension as the electrical box 22 must be slideable with respect to the slide member 40 but have enough clearance that the slide member 40 does not bind the box 22 and prevent it from sliding within the opening. As the arms 48 are substantially parallel to one another, clearance between each arm 48 and the adjacent slide member 40 is also preferably between 0.001 and 0.030 inch.

With reference to FIG. 6, the guiding apertures 62 in the arms 48 each include a center 90. It is critical that the guiding apertures 62 have a close enough spacing to enable a plurality of offsets with respect to the unfinished wall surface (not shown). It is preferred that the guiding apertures 62 in the arms 48 are spaced apart a distance of between 0.170 and 0.500 inch center to center.

With reference to FIG. 4, the flange 42 portion of the slide member 40 preferably includes a plurality of apertures 92 therein. The apertures 92 enhance the adherence of stucco (not shown) when the stucco is applied thereto to finish the wall surface. The apertures in the flange 42 preferably include a diameter of at least 0.125 inch and no greater than 0.500 inch.

The electrical box and the slide member may each be molded in one piece from plastic. Suitable plastic materials for the box and slide member include polycarbonate, polyvinylchloride, polyethylene, polypropylene, or acrylonitrile butadiene styrene. Alternatively, the electrical box and the slide member may be formed from metal.

The offset of the front edge of the box from the unfinished surface is determined by the fastening and adjustment arrangement, which includes selection and alignment of one of the guiding apertures in the arms with one of the receiving apertures in the sidewalls of the electrical box.

The reader is referred to FIG. 9 for an understanding of the operation of the electrical box assembly 20 of the present invention. The electrical box 22 and slide member 40 could be provided as separate pieces but more typically would be provided as an assembly 20 (see FIGS. 7 and 8) with the box 22 and slide member 40 secured together by the fastening and adjustment arrangement 60. When provided as an assembly 20, the box 22 would be secured to the slide member 40 and would include an offset, such as the offset 01 shown in FIG. 9. However, in stucco wall construction, studs are typically covered with plywood, foam, and then the stucco layer. Depending on the local building codes and the area the building is constructed in, various thicknesses of foam and stucco are stipulated. Therefore, if the local code calls for 1 inch of foam and ¼ inch of stucco, then the contractor allows 1¼ inch plus ½ inch for the front of the box to extend beyond the wall surface to allow the cover to open and close. In other areas, the local code could specify larger or smaller thicknesses of foam and stucco. Therefore, at the job site, if the job required an offset different than the preset offset, an installer would loosen the fastening and adjustment arrangement 60 and slide the electrical box 22 with respect to the slide member 40 until the desired offset was obtained. The offset 01 is measured as shown in FIG. 9, from the surface 58 of the unfinished wall 52 to the expected surface 68 of the finishing layer 70. The installer would first make a hole 94 in the plywood or unfinished wall 52 with the hole 94 preferably larger than the sidewalls 24 of the electrical box 22. With the electrical box 22 secured to the slide member 40 at the desired offset, the electrical box assembly 20 is then inserted into the hole 94 until the rear surface 46 of the flange 42 is flush against said the unfinished surface 58. The installation of the electrical box assembly 20 is completed by securing the assembly 20 to the unfinished surface 58 with the mounting arrangement 50, including the mounting fasteners 56 driven through the mounting apertures 54 in the flange 42 and into the wall 52.

As shown in FIG. 7, the vertical adjustable electrical box assembly 20 may include a cover member 31 as shown. The cover member 31 includes U-shaped slots 102 and a latch member 104 having an opening 106 therein. The electrical box 22 includes U-shaped slots 108 and a tab 110 extending downwardly from the sidewall 24. When the cover 31 is closed upon the electrical box 22, a portion of the latch member 104 adjacent the opening 106 makes contact with the tab 110 of the electrical box 22. By slight force of the cover 31 against the box 22, the opening 106 of the latch member 104 snaps over the tab 110, the tab 110 snaps back to its unbiased position, and the latch member 104 and cover 31 are thereby held closed against the electrical box 22. When closed against the electrical box 22, the U-shaped slots 102 in the cover member 31 are in alignment with the U-shaped slots 108 in the electrical box 22, thereby providing substantially circular cord openings to allow connection of electrical cords to the electrical device within the box while the cover is closed (not shown). As shown in FIG. 7, the cover member 31 includes ears 112 having apertures 114 therein. The electrical box 22 includes posts 116 which provide a pivot point for the cover member 31 to pivot upon. In the vertical embodiment of the electrical box assembly 20, the posts are located on the long sidewalls 24C of the electrical box 22.

Figure 8:
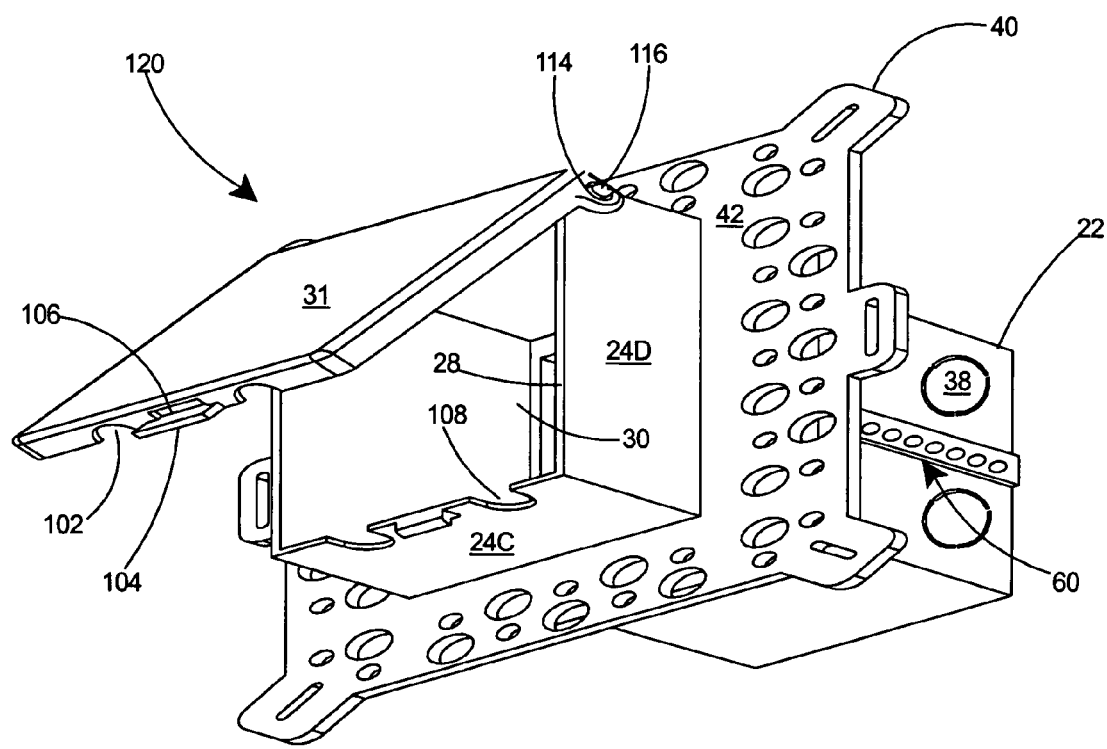
FIG. 8 is a perspective view of a horizontal electrical box assembly according to the present invention.
Figure 10:
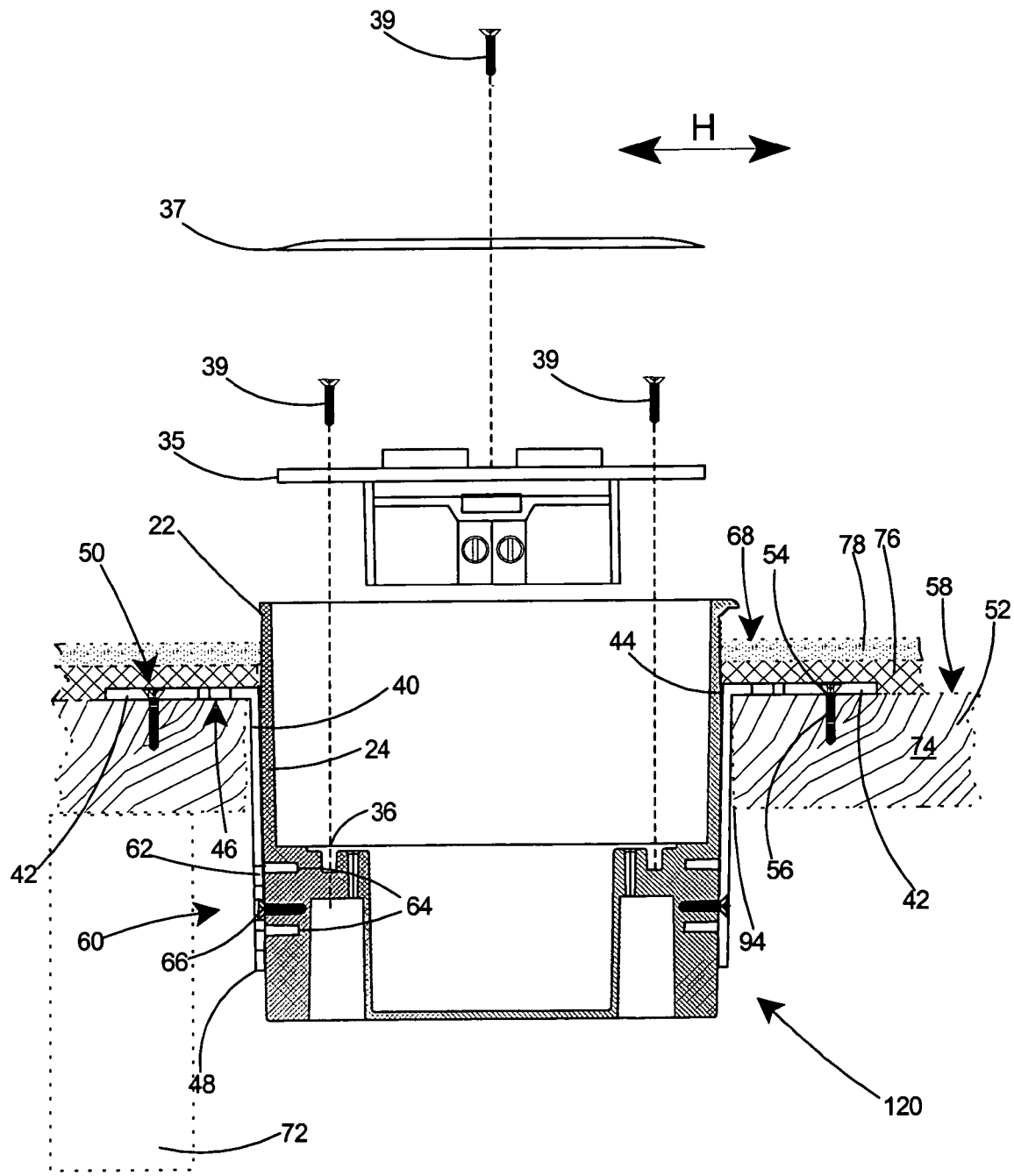
FIG. 10 is a sectional view of a horizontal electrical box assembly secured to a wall.

A second embodiment of an adjustable electrical box assembly 120 according to the present invention is depicted in FIGS. 8 and 10. The second embodiment of the electrical box assembly 120 described herein may be referred to as a horizontal box assembly 120 as it is used for securing a wall-mounted electrical device 35 (see FIG. 10) to a wall in a horizontal orientation (H arrow in FIG. 10). The horizontal electrical box assembly 120 includes an electrical box 22 and a slide member 40 analogous to the vertical electrical box assembly. However, in the horizontal embodiment of the electrical box assembly 20, the posts are located on the short sidewalls 24D of the electrical box 22 rather than on the long sidewalls 24C. Therefore the horizontal electrical box assembly 120 may be mounted in a horizontal orientation on a wall (see FIG. 10) to accommodate an electrical device 35 in a horizontal orientation.

The adjustable electrical box assembly of the present invention therefore simplifies the task of mounting an electrical box to an unfinished wall. With knowledge of the local building codes, the adjustable electrical box assembly of the present invention allows the electrical contractor to secure an electrical box to an unfinished wall with an accurate offset, thereby allowing the electrical contractor to finish the building's wiring before the wall is finished. The adjustable electrical box assembly therefore enables the finishing contractor to simply apply the correct thicknesses of foam and stucco and be assured that the front edges of each electrical box will be at the desired offset from the finished wall surface. By enabling a plurality of potential offsets with respect to the wall, the adjustable electrical box assembly of the present invention furthermore reduces stocking and inventory requirements of electrical boxes, as the one assembly can be used in various areas having different building codes.

With reference to FIG. 9, a larger offset can be set by simply removing the fastener 66 of the fastening and adjustment arrangement 60, sliding the box 22 with respect to the slide member 40 until an appropriate guiding aperture 62 is in axial alignment with an appropriate receiving aperture 64, and securing the fastener 66 into the aligned apertures.

Figure 11:
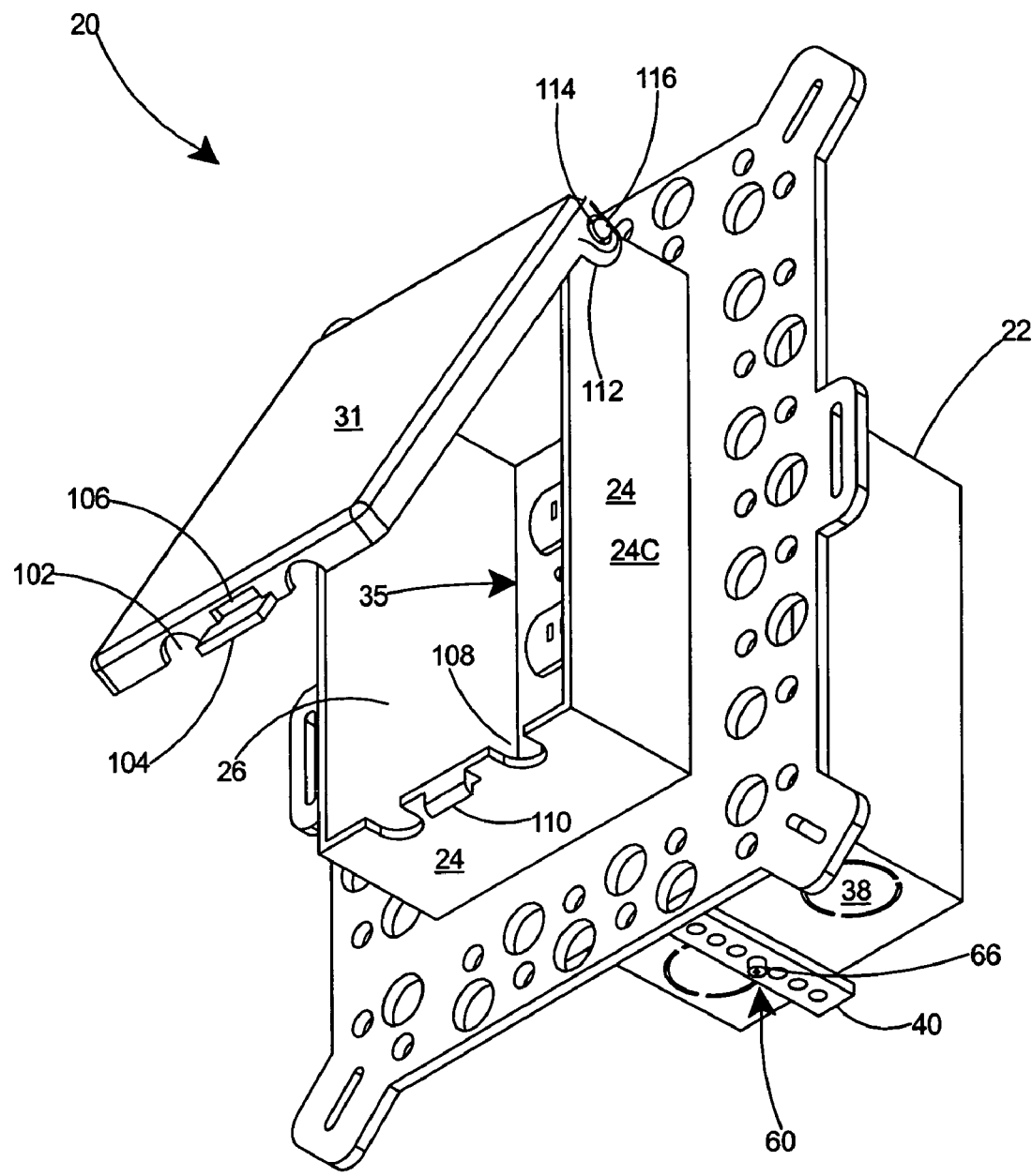
FIG. 11 is a perspective view of a vertical electrical box assembly with a duplex outlet installed therein.

Referring to FIG. 11, any electrical device, such as the duplex outlet 35 shown in the figure, is recessed a substantial distance within the electrical box 22, thereby protecting the device from accidental contact or damage by lawn equipment or the like. As shown in FIG. 9, this is a result of the bosses 34 being recessed a substantial distance behind the front edge 28 of the electrical box 22.

Having thus described the invention with reference to a preferred embodiment, it is to be understood that the invention is not so limited by the description herein but is defined as follows by the appended claims.

What is claimed is:

1. An assembly for providing electrical device on a surface comprising:
    a box having sidewalls, a front edge, and a cavity for receiving said electrical device therein;
    said electrical box recessing said electrical device a substantial distance behind said front edge of said box;
    a slide member positioned outside of said sidewalls of said box;
    said slide member including a flange having a rear surface, said flange including an opening therein;
    arms extending inwardly from said rear surface of said flange;
    a mounting arrangement on said flange for securing said slide member to said surface;
    a fastening and adjustment arrangement on said arms and on said sidewalls of said box for securing said box to said slide member and for adjusting the distance said front edge of said box is offset from said surface; and
    said fastening and adjustment arrangement including a plurality of guiding apertures in said arms, a plurality of receiving apertures in said sidewalls of said box, and at least one fastener associated with each of said arms for securing through said guiding apertures in said arms into said receiving apertures in said sidewalls of said electrical box;
    whereby the offset of said front edge of said box from the surface is determined by the selection and alignment of one of said guiding apertures in said arms with one of said receiving apertures in said sidewalls of said electrical box.

2. The assembly of claim 1 wherein
    said arms include a first arm and a second arm in substantially parallel planes on opposing sides of said opening in said flange; and
    each aperture in said plurality of apertures in said first arm are in axial alignment with a matching aperture in said plurality of apertures in said second arm.

3. The assembly of claim 1 wherein
    said box includes opposing sidewalls;
    an outer dimension as measured across said opposing sidewalls of said box;
    said opening in said flange of said slide member includes opposing sides;
    an inner dimension as measured across said opposing sides of said opening in said flange; and
    said outer dimension across said opposing sidewalls of said box is between 0.001 and 0.090 inch smaller than said inner dimension across said opposing sides of said opening in said flange.

4. The assembly of claim 1 including a securing arrangement for securing an electrical device within said box.

5. The assembly of claim 4 wherein said securing arrangement includes
    an inner surface on said sidewalls of said box;
    one or more bosses integral with and extending from said inner surface of said sidewalls;
    bores within said bosses for receipt of fasteners for securing said electrical device to said box; and
    said bosses located a substantial distance behind said front edge of said box such that said electrical device when secured thereto is recessed substantially behind said front edge.

6. The assembly of claim 1 including
one or more removable wall portions in said sidewalls of said box; and
brace members extending horizontally from each side of said opening in said flange and extending vertically between said arms of said flange.

7. An assembly for providing electrical device on a surface comprising:
a box having sidewalls, a front edge, and a cavity for receiving said electrical device therein;
said electrical box recessing said electrical device a substantial distance behind said front edge of said box;
a slide member positioned outside of said sidewalls of said box;
said slide member including a flange having a rear surface, said flange including an opening therein;
arms extending inwardly from said rear surface of said flange;
a mounting arrangement on said flange for securing said slide member to said surface;
a fastening and adjustment arrangement on said arms and on said sidewalls of said box for securing said box to said slide member and for adjusting the distance said front edge of said box is offset from the surface;
outward extending ears on said flange; and
apertures in said ears.

8. The assembly of claim 7 wherein said flange has a thickness between 0.070 and 0.150 inch.

9. The assembly of claim 7 wherein said flange extends outward at least 0.5 inch from said opening.

10. A method of installing an electrical service on a surface including:
providing a box having sidewalls, a back wall, a front opening, a front edge, and a cavity therein;
providing one or more bosses a substantial distance behind said front edge of said box such that said electrical device when secured thereto is recessed substantially behind said front edge of said box;
providing a slide member positioned outside of said sidewalls of said box, said slide member including a flange having a rear surface, an opening therein, and arms extending from said rear surface;
providing a mounting arrangement on said flange for securing said slide member to said surface;
providing a fastening and adjustment arrangement on said arms and on said sidewalls of said box for securing said box to said slide member and for adjusting the distance said front edge of said box is offset from said surface, said fastening and adjustment arrangement including a plurality of apertures in said arms and a fastener associated with each of said arms for securing through said arms into said sidewalls of said electrical box whereby the offset of said front edge of said box from the surface is determined by the selection of one aperture of said plurality of apertures;
making a hole in said surface, said hole larger than said sidewalls of said box;
selecting a desired offset for said front edge of said box from said surface, said desired offset based upon the thickness of the finishing layer to be installed on said surface;
setting said front edge of said box is at said desired offset from said rear surface of said flange;
securing said box to said slide member with said fastening and adjustment arrangement to form an electrical box assembly;
inserting said electrical box assembly into said hole in said surface until said rear surface of said flange is flush against said surface; and
securing said electrical box assembly to said surface with said mounting arrangement.

* * * * *